S. McELROY.
Distance-Measuring Apparatus.
No. 155,458. Patented Sept. 29, 1874.
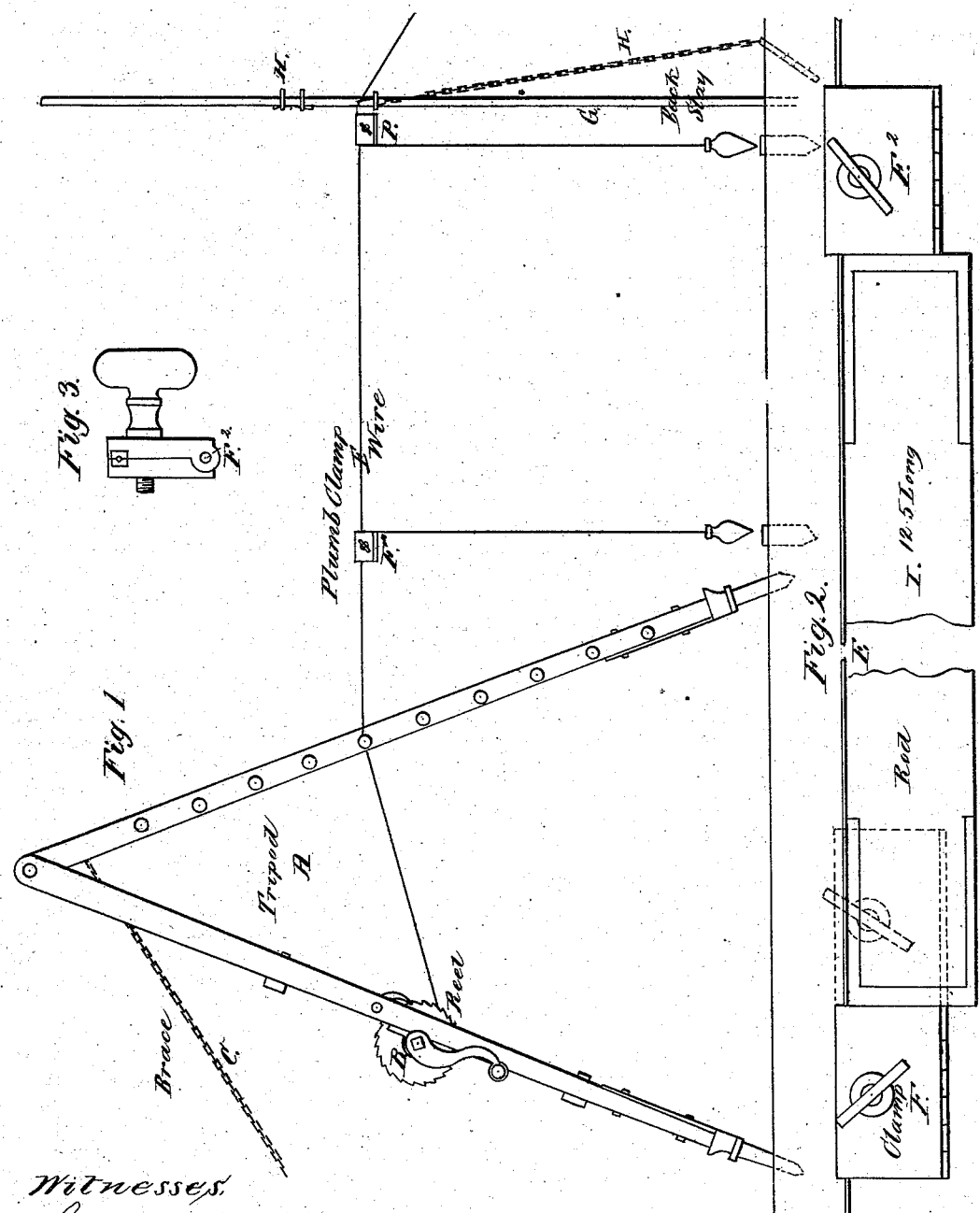

Figure 1 is an elevation of the apparatus complete set up for operation. Figs. 2 and 3 are views of the measuring-rod and clamps.

UNITED STATES PATENT OFFICE.

SAMUEL McELROY, OF BROOKLYN, NEW YORK.

IMPROVEMENT IN DISTANCE-MEASURING APPARATUS.

Specification forming part of Letters Patent No. 155,458, dated September 29, 1874; application filed September 2, 1873.

*To all whom it may concern:*

Be it known that I, SAMUEL McELROY, of Brooklyn, in the county of Kings and State of New York, have invented a certain new and useful Improvement in Measuring Apparatus, of which the following is a specification:

The said invention relates to the use of rods on a stretched line for the purpose of measuring; and, instead of the two rods usually employed, the one butting against the other and alternately shifted throughout the distance required, it consists of a series of clamps and a single measuring-rod. By means of a tripod and back-stay, a steel wire of No. 13 gage is first stretched and leveled over about five hundred feet of the distance to be measured, with a plumb hanging from the face of a clamp to a stake at the starting-point. Ordinary surveying flag-poles may be set up under the line, at intervals of seventy-five feet, to prevent undue sagging. One end of a wooden measuring-rod, which it is convenient to have twelve and a half feet long, is brought to the face of the clamp, and, while the rod is held in contact under the wire, another clamp is brought to the other end of the rod. The rod being removed, a third clamp is placed on the wire and secured with its face against the face of the second clamp. The second clamp is then shifted to make place for the rod, and is brought in contact with its end when applied as before, and the operation is repeated until the last measurement, which is marked by a stake, located by a plumb from the face of the clamp. In this way the shifting of the two clamps and the use of a single rod occasion a compensation of the errors arising from manipulation. The first clamp, with the plumb over the stake, is left in position during the time of making the measurement to indicate any disturbance of the line.

To enable others skilled in the arts to which it appertains to make and use my invention, I will proceed to describe its construction and operation with reference to the drawing.

Figure 1 is an elevation of the apparatus complete set up for operation. Figs. 2 and 3 are views of the measuring-rod and clamps.

The tripod A is set up on the base-line, and about five hundred feet beyond the starting-point, so as to bring its center on the line of proposed measurement, and it is braced by a light chain, C, secured to a stay-pin driven in the ground. The double legs of the tripod carry a reel holding five or six hundred feet of wire, and the front leg has a row of pins placed at short intervals for use in leveling the wire. A short distance behind the starting-point, on the base-line, an iron rod, G, is driven in the ground as a back-stay, and braced by light chains secured to sliding rings, that may be wedged in any position on the rod to bring and hold it in line. The back-stay also carries a sliding rest for wire, which may be secured at the proper level. The wire being unreeled, supported on its rests, secured, and brought to a firm tension and level, or, if set on a slope, its inclination determined with a leveling-instrument for use in reducing the measurements, the plumb-clamp P is brought over the starting-point and secured. The rod I is then brought to the line, with one end in contact with the clamp, and a clamp, F, secured in contact with the other end. The rod is then relieved, and a second sliding clamp, which is used as a back clamp, is set on the wire on the plumb-clamp side, brought in contact with the face of the forward clamp, and fastened by the set-screw. The forward clamp is then relieved and moved forward the length of the rod, which is adjusted to the back clamp, as it was originally to the plumb-clamp, and against which the forward clamp is put in contact and fastened at its forward end. The rod is then again relieved, the back clamp loosened, moved forward, and brought in contact with the forward clamp, which, in its turn, is relieved and moved forward the length of the rod for a new measurement; and this process is continued to a point near the tripod, when a plumb-clamp and line take the place of the forward clamp at the end of the rod, and a stake is put in to determine a fixed distance and the starting-point of a continued measurement, the tripod, &c., being carried forward by the assistants, and the back-stay set up near and behind the last stake for this purpose. These clamps, as shown in Fig. 3, are hinged and notched for the reception of the wire, and fitted with set-screws, by which they may be secured. Their entire value depends upon the accuracy with which they are squared at the ends at right angles to the notch for the reception of the wire. When the measurement of the line has been completed in the manner hereinbefore described, the tripod and wire and back-stay are shifted to commence anew.

The parts of the apparatus may be so light that a party of three can measure on favorable ground about half a mile a day. This arrangement combines rigidity and lightness, convenience of use and transportation, and economy and accuracy of work.

I claim as my invention—

1. The combination of the tripod, carrying-reel, back-brace, wire, and adjustable clamps, substantially as described.

2. In a measuring-instrument, substantially such as described, the clamps provided with grooves for the reception of the wire, and made with squared ends, as set forth.

SAMUEL McELROY.

Witnesses:
WM. KEMBLE HALL,
SAM. B. HOUSE.